March 7, 1950 R. J. TINKHAM ET AL 2,499,700

MAGNETIC RECORDING AND REPRODUCING APPARATUS

Filed Dec. 30, 1947 4 Sheets-Sheet 1

INVENTORS:
RUSSELL J. TINKHAM,
ROBERT L. LANDON,

BY [signature]
ATTORNEY

MAGNETIC RECORDING AND REPRODUCING APPARATUS

Filed Dec. 30, 1947 4 Sheets-Sheet 2

INVENTORS:
RUSSELL J. TINKHAM,
ROBERT L. LANDON,
BY [signature]
ATTORNEY

MAGNETIC RECORDING AND REPRODUCING APPARATUS

Filed Dec. 30, 1947 4 Sheets-Sheet 3

INVENTORS:
RUSSELL J. TINKHAM,
ROBERT L. LANDON,
BY
J. Harold Kilcoyne
ATTORNEY

MAGNETIC RECORDING AND REPRODUCING APPARATUS

Filed Dec. 30, 1947 4 Sheets-Sheet 4

INVENTORS:
RUSSELL J. TINKHAM,
ROBERT L. LANDON,

BY Harold Lieggne
ATTORNEY

Patented Mar. 7, 1950 2,499,700

UNITED STATES PATENT OFFICE 2,499,700

MAGNETIC RECORDING AND REPRODUCING APPARATUS

Russell J. Tinkham and Robert L. Landon, Chicago, Ill., assignors to Magnecord, Inc., Chicago, Ill., a corporation of Illinois Application December 30, 1947, Serial No. 794,630

7 Claims. (Cl. 179—100.2)

This invention relates to improvements in magnetic recording and reproducing apparatus employing an endless ribbon or tape form of record medium, and more particularly to an interchangeable magazine type of sound-on-tape repeating machine designed for endless ribbon or tape recording and/or reproducing.

The advantages that magnetic recording and reproducing offers over other known methods of sound recording and reproducing namely, ease in making original recording, re-recording, editing and splicing, re-use of recording medium, improved sound quality, et cetera, are well recognized. The use of magnetizable wire and tape as the record media employed in such methods is of course well known, but usually the tape and wire record media took the form of long lengths of wire or tape spooled on reels, and were not suitable for short length repeat recording and reproducing, for example, for and in coin operated selective phonographs or "juke boxes," spot announcing and advertising machines and the like. For such short length recordings, the endless loop record medium, particularly of wire, appeared to provide the solution, but the prior methods of using wire loops for repeatable recording and reproducing were rendered complicated by the manufacturing accuracy of parts required, plus the difficulties of maintaining tension to prevent fouling. Generally speaking, these objections applied also to the prior systems of repeat recording using the endless tape record medium, taken with the difficulties encountered in magazining or storing an endless tape record medium in a repeating type machine.

With the above considerations in mind, the present invention contemplates and aims to provide a simple, dependable and thoroughly practical recording and/or reproducing machine using an endless loop record medium which retains the aforesaid advantages of magnetic recording systems, while at the same time overcoming the disadvantage of the conventional magnetic recording or reproducing systems when used for short length or repeatable reproducing, as well as avoiding the complications and difficulties aforesaid of the prior systems employing endless loop form of record media.

A further object of the invention is the provision of a recording and/or reproducing machine using an endless loop sound-on-tape record medium, which incorporates a thoroughly effective and foolproof system of magazining (storing) the endless tape record medium and of relating the magazined tape with the machine for repeat playing.

Another object of the invention is the provision of a practical and thoroughly dependable interchangeable magazine type of recording machine suitable for endless loop reproducing and which is so constructed and arranged as to satisfy in effective manner the requirements of the so-called repeating machines, such as "juke boxes," spot announcing and advertising machines, and the like.

More detailed objects are the provision of an interchangeable magazine type of recording and/or reproducing machine employing an endless tape record medium of simple yet effective driving means for said endless tape; the provision of a simple and dependable start-stop system insuring stopping of the endless tape record medium at the proper point following a played sequence and the conditioning thereof for an immediate repeat playing; the provision of an inexpensive and practical magazine effective for storing the endless tape record medium, which readily may be mounted on and removed from the machine as a self-contained record package or unit; and the provision of a magazine mounting means provided on the machine which is of simple construction and permits ready interchange of one endless tape magazine for another when such is desired.

The above and other objects and advantages of the invention will be apparent from the following detailed description of an interchangeable magazine type of magnetic reproducing machine employing an endless tape record medium, taken with the accompanying drawings illustrating a physical embodiment of such a machine selected for the purpose of simple disclosure, wherein—

Figure 2:
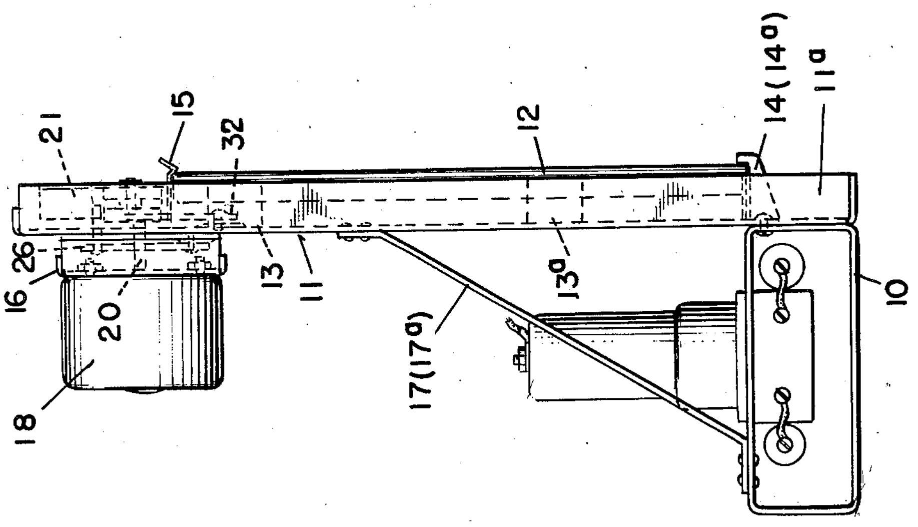
Fig. 2 is a side elevation of the machine illustrated in Fig. 1.

In the drawings, wherein like reference characters designate similar parts throughout the several views, reference character 10 (Fig. 2) designates an amplifier chassis as used in a conventional magnetic reproducing and/or recording machine, the electrical features of which are well known and hence will not be described. Affixed to the forward vertical face of the chassis is an upright machine or supporting plate 11 (Fig. 1) shown to have forwardly extending flanges on all of its edges. The plate removably supports an endless tape magazine 12 to be described and is accordingly provided with struck-up guide flanges 13, 13a which are vertically aligned and are spaced horizontally from the side-edge plate flange 11a the width of the magazine, and with struck-out supporting feet 14, 14a on which the magazine is adapted to rest. Suitable means such as a spring clip 15 affixed to and projecting forwardly from the plate is adapted to latch over the top edge of the magazine thereby to removably secure it in mounted position on the machine plate.

Affixed to and disposed to the rear of the machine plate 11 is a vertically disposed motor mounting plate 16 (Fig. 5) on which the drive source (motor) of the tape driving means to be described in detail hereinafter is mounted. It will be seen from Figs. 1, 2, 4 and 5, that the chassis 10, the machine plate 11, the motor mounting plate 16, and the tape driving means may and preferably are assembled together as a fixed machine assembly, also incorporating suitable braces 17, 17a operative between chassis and rear face of the machine plate to maintain the latter upright under the load of the tape driving means and of the removable endless tape magazine 12.

Figures 3, 3A, 4, 4A:
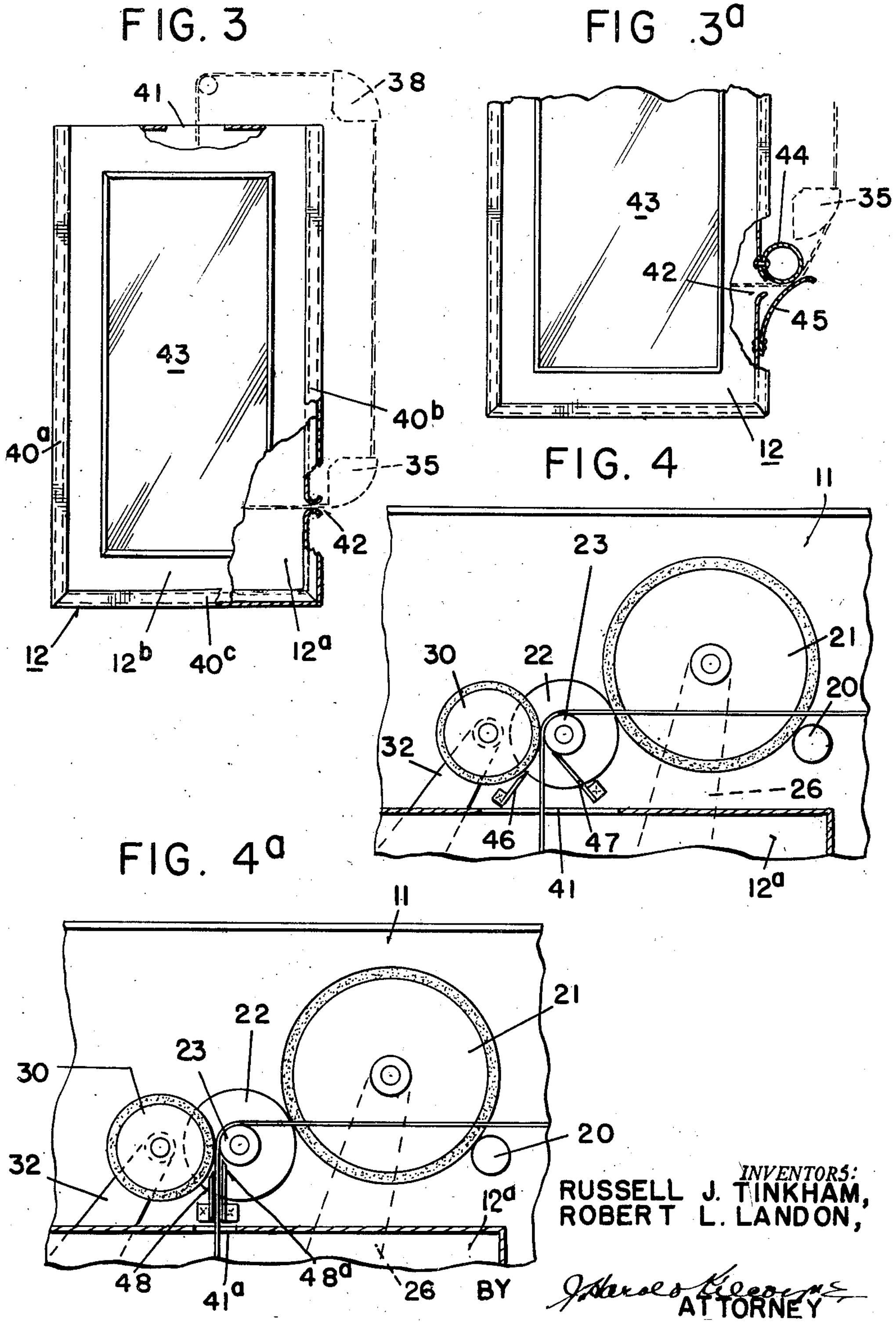
Fig. 3 is a partly broken away front view illustrating a preferred construction of endless tape magazine according to this invention and the manner in which it effects storing of the tape.
Fig. 3A is a similar view illustrating a somewhat modified form of endless tape magazine.
Fig. 4 is an enlarged detail view illustrating a simple tape driving means as herein contemplated, in conjunction with tape-to-magazine guiding means.
Fig. 4a is a detail view illustrating a modified form of tape-to-magazine guiding means.
Figure 5:
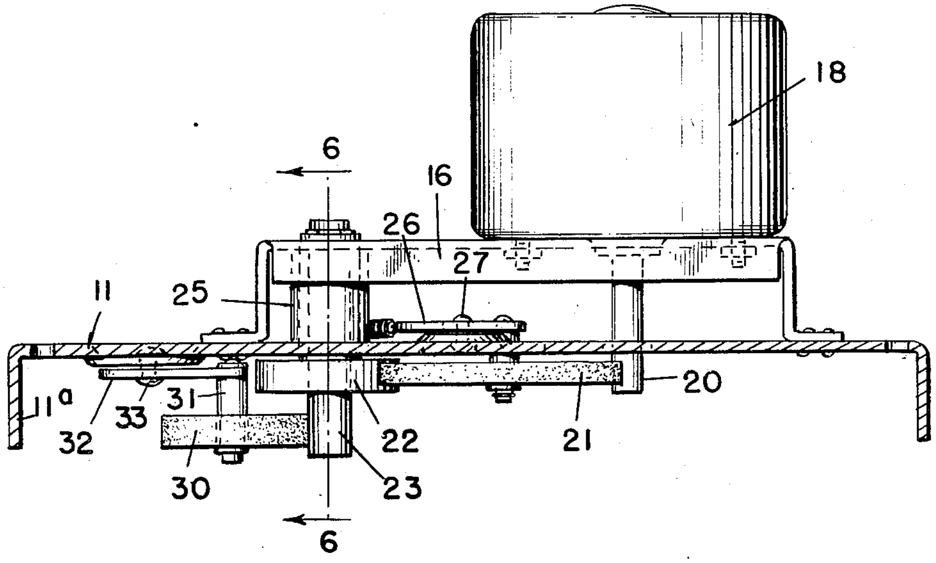
Fig. 5 is a section on line 5—5 of Fig. 1 further illustrating the tape driving means and the mounting of the components thereof.
Figure 6:
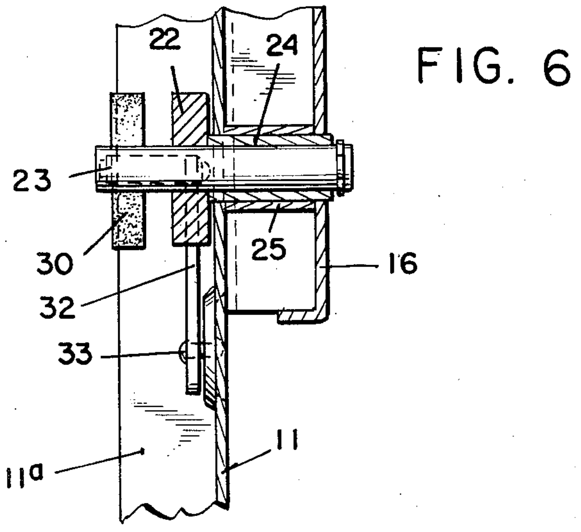
Fig. 6 is a section taken along line 6—6 of Fig. 4.

Referring to Figs. 4 and 5, illustrating a simple yet effective form of tape drive, a driving motor 18 is shown to be bolted to the rear face of the plate 16, so that its shaft 20 extends forwardly through both the plates 11 and 16, and its outer end drivingly engages the periphery of a speed reducing roller 21, which in turn drives a second speed reducing roller 22. As is best seen in Fig. 6, the roller 22 is fast on a capstan 23, over whose forward end the tape is run, and whose rearward end is journaled for rotation in an oilite bearing 24 carrying a spacer sleeve 25, the bearing being supported at its ends in the machine and motor mounting plates 11, 16. As is conventional, the speed reducing roller 21 may be provided with a friction engaging surface or it may be molded from friction material.

Preferably, the speed reducing roller 21 is carried at the upper end of an arm 26 disposed rearwardly of and pivotally connected at its lower end to the machine plate 11 through a pin 27. The hole in the arm through which the pin passes is vertically slotted to allow the roller 21 to seek its own position between motor shaft 20 and companion speed reducing roller 22, and a spring 29 operative between the lower end of the arm 26 and a fixed point on the machine plate 11 applies a spring force of sufficient magnitude to hold the roll assembly in position.

As above stated, the tape passes over the capstan 23, being gripped between the capstan and a friction-faced pressure roller 30 which may be mounted on a shaft 31 carried at the free upper end of an arm 32 disposed forwardly of and pivoted by pin 33 to the machine plate 11. Spring 34 reactive between arm 31 and a fixed point on the supporting plate applies resilient pressure to the pressure roll and hence on the tape, which pressure may be adjusted by any approved means.

It will be understood that the sizes of the various rollers of the tape drive are proportioned so as to impart the desired speed to the tape. A speed of from 6 to 18 inches per second has been found suitable for most audio frequency signals, depending on the properties of the tape.

Figure 1:
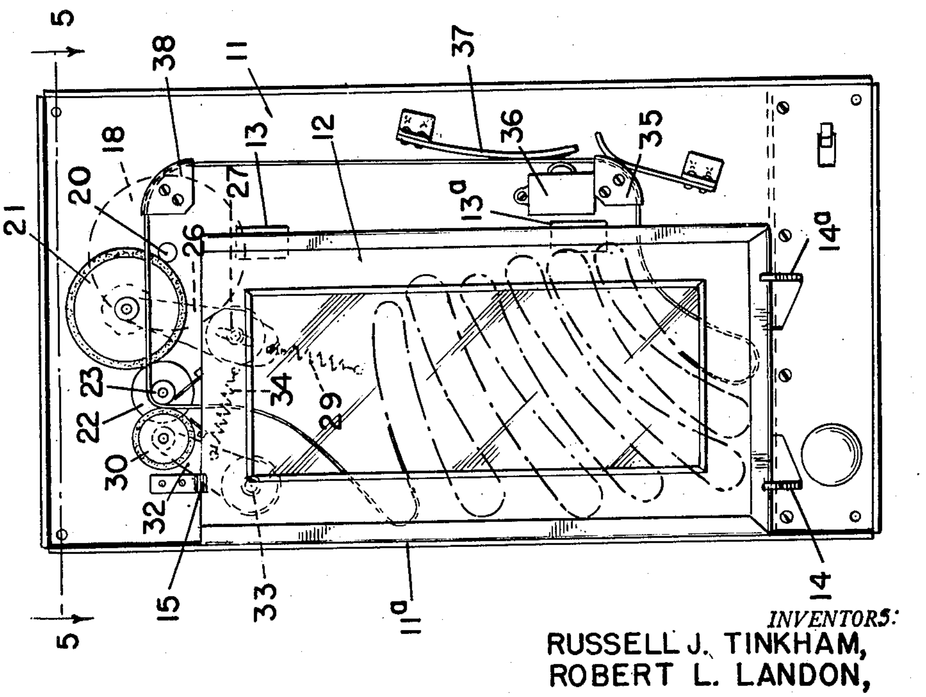
Fig. 1 is a front elevation of an interchangeable magazine type reproducing (or recording) machine employing an endless tape record medium according to the invention.

By reference to Fig. 1, the machine plate 11 fixedly mounts a lower tape guide shoe 35, transducer 36 in the form of a conventional magnetic recording and reproducing head, a spring 37 to maintain the tape in contact with the head, and an upper guide shoe 38. The lower guide shoe 35 is disposed to the side of and somewhat above the lower right corner of the mounted magazine and generally vertically below the guide shoe 38, the shoes thus functioning to guide an external portion of the tape drawn from the lower end of the magazine upwardly and thence around the upper right corner of the mounted magazine, while at the same time permitting free mounting and de-mounting of said magazine. The head 36 is shown to be disposed in the path of the tape moving between the guide shoes, and is as far removed as possible from the motor 18 to reduce hum pickup in the electrical portion of the machine, although it will be understood that it can be placed anywhere between magazine outlet and capstan and its location as well as that of the guide shoes may accordingly be varied to satisfy particular design requirements. If the machine is used as a recorder, an erase head (not shown) is placed ahead of (below) the magnetic head 36 to erase the previously recorded tape.

According to a further feature of the invention, the magazine 12 is capable of storing an endless loop of sound-on-tape record medium having substantial total length and of being removably related with a machine characterized as in the foregoing as a self-contained record package or unit. One form of tape found to be eminently suitable for storage in and ready withdrawal from the magazine is made from non-metallic insulating material having paramagnetic particles embedded therein, the material making up the body of the tape being selected so as to have lateral stiffness. When a tape as aforesaid is fed into a magazine providing a confined space of width slightly greater than the width of the tape, the latter layers itself in the manner generally illustrated in Fig. 1 without fouling, and can be readily drawn from the magazine and fed back into the magazine as well.

Referring to Fig. 3, illustrating the constructional details of a preferred endless tape magazine according to the invention, the magazine 12 may comprise an open-front rectangular box body or back 12a and a readily removable plane-form front cover 12b therefor which together form a confined space of the specified width to cause layering of the tape therein. To mount and secure the cover, the side and bottom walls of the magazine back 12a are formed along their forward edges with reversely bent flanges, of which the side wall flanges 40a, 40b provide receiving channels or grooves in which the cover may slide, and the bottom flange 40c provides a stop which holds the cover in place. The top wall of the back is devoid of such a flange so that the cover is freely slidable into and out of cover-forming relation with the back through the top thereof. Hence, by simple withdrawal of the cover 12b the magazine may be simply loaded and unloaded.

The top wall of the magazine back is provided with a relatively wide tape inlet opening 41, and it is a feature of the invention that the tape outlet opening 42 is provided in the side wall thereof adjacent the magnetic head 36 and slightly above the magazine bottom. Such disposition of tape outlet opening has been found to provide in the tape itself a measure of automatic self-tensioning consequent to the weight of the layered loop within the magazine acting on the tape being withdrawn, and it also prevents the tape from spilling through the outlet opening, as is possible if such opening is disposed in the bottom of the magazine. Preferably, the tape outlet opening 42 is shaped as a small-height slit, and the lips defining the same are formed on a radius to facilitate tape withdrawal.

Although the magazine cover 12b may be fashioned from an opaque material i. e., sheet metal, it may include a transparent glass panel 43 through which the varied movement of the tape as it layers itself in and feeds through the magazine may be viewed.

According to the somewhat modified magazine illustrated in Fig. 3A, the tape magazine may carry positive tape tensioning means adjacent its tape outlet opening as aforesaid, which as shown comprises a cylindrical tape guide 44 affixed to the outer face of the side wall of the magazine back above the outlet opening and an adjustable pressure spring 45 preferably of the leaf type which extends from below the opening and has its free end bearing with spring pressure on the tape running over the guide 44. The aforesaid tape tensioning means may be employed in place of or in conjunction with the lower guide shoe 35 and, when used in substitution of the latter, it functions both to tension the external portion of the tape and guide it to the magnetic head 36 upon its withdrawal from the magazine.

To insure positive feed of the tape on the slack side of the capstan 23 to the magazine through the wide inlet opening 41 thereof, angularly disposed baffles or deflectors 46, 47 may be provided as shown. As seen in Fig. 4, the deflector 46 "skins" the tape from the pressure roller 30 and the deflector 47 similarly "skins" the tape from the capstan 23, as the word "skins" is used to mean lifting the slack tape below the capstan that might tend to wrap around either of said rotating parts. Both said deflectors 46, 47 are shown to be mounted on the machine plate 11, but they may be mounted on the magazine as a component part thereof.

A somewhat modified form of tape guiding means is illustrated in Fig. 4A, such comprising a pair of vertically disposed guide members 48, 48a carried by the machine plate 11 (or by the magazine) being placed close together to provide a vertical, narrow width slot which positively guides the tape leaving the capstan to the tape inlet opening 41a of the magazine which in this case may be formed as a narrow width slit. The upper edges of the guide members may be formed as oppositely disposed knife edges, the one preventing the slack tape from wrapping around the pressure roller 30 and the other preventing the tape from wrapping around the capstan 23.

It will be seen that the magazine stores the major length of the endless tape but always provides an external length portion extending between the magazine outlet and inlet openings 42, 41, respectively. Accordingly, the endless tape magazine and the endless tape confined therein provides an endless tape package which is so constructed that it may be simply secured in place on the machine by inserting it between the machine plate edge flange 11a and the guide flanges 13, 13a to rest on the supporting feet 14, 14a, while at the same time providing an external length of tape capable of being acted upon by the tape driving means and the magnetic head 36. When the magazine is so mounted on the machine, such external portion of the tape is readily available for threading around the lower guide shoe 35, between the magnetic head 36 and its associated hold-down spring 37, over guide shoe 38, and between capstan 23 and pressure roller 30. Accordingly, when the tape driving means is put into operation, it operates to draw the tape from the outlet opening 42 of the magazine over the lower guide shoe 35 which insures proper travel of the tape to the magnetic head, from whence it passes to and over the guide shoe 38 and is fed into the magazine 12 through the inlet opening 42 thereof. If tape tensioning means as described in Fig. 3A is provided, such acts to tension the tape in its external length portion, but such tensioning means may also be applied by the lower guide shoe 35 as will be subsequently described. Due to its lateral stiffness, the tape being fed to the magazine random-layers itself naturally therein and without fouling, and in such manner that it can readily withdraw therefrom. As is well understood, the tape in passing over the magnetic head 36, feeds a signal to said head which passes it to the amplifier as is conventional in magnetic recording (reproducing) machines, the output of the amplifier being fed to a loud speaker, for example.

Figures 7, 8, 10:
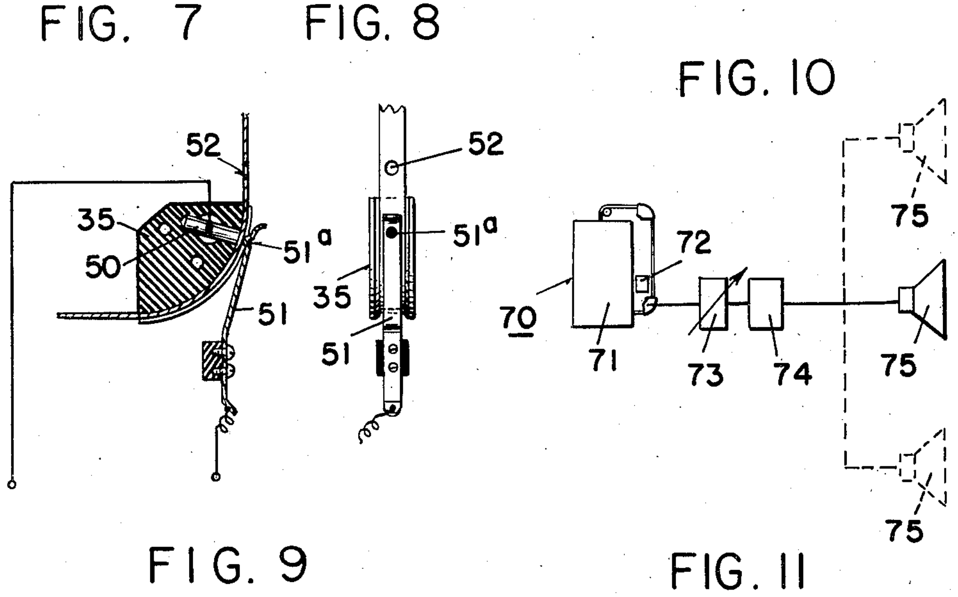
Figs. 7 and 8 are enlarged detail views of the start-stop switch means for controlling stopping of the tape following the playing of a recorded sequence.
Figs. 10 and 11 are block diagrams illustrating respectively the application of the endless tape recording machine of the invention to a spot announcing or advertising machine and to a "juke box."

When the machine as aforesaid is used for reproducing purposes, the described endless tape record medium will have one or a plurality of sequences recorded thereon. A stop-start control means operative to stop the machine, as by interrupting the tape drive after each recorded sequence has been played and to condition the endless tape record medium for an immediate re-starting or re-playing, is provided. Referring to Figs. 7 and 8, such means may be associated with the lower guide shoe 35 which is provided with an electrically conducting insert pin 50 over which the tape runs as it is driven as aforesaid. A spring contact 51 is positioned so as to bear on the tape running over the shoe, being prevented by the insulating tape from making contact with the conducting pin 50 of the guide shoe except when a hole 52 or one of a series of such holes provided in the tape passes under the contact point 51a provided on the contact 51. It will be observed that the spring contact 51 also tensions the tape running over the shoe, with the shoe and contact spring having tape tensioning function in addition to tape guiding and stop-start control functions. When the hole 52 arrives under the contact point 51a, a momentary contact between point and pin is made, and the motor is immediately deenergized as will be described. However, the dynamics of the tape driving means is adjusted so that after establishing the momentary contact aforesaid, the hole 52 in the tape is pulled slightly past the contact point, whereby the tape is conditioned for immediate restarting or repeat.

Further to the hole or series of holes 52 referred to above, one such "stop" hole is provided if the sequence is recorded on substantially the whole length of the endless tape, in which case the entire length of tape is run through the magazine for each playing, with the tape drive being interrupted after one complete circuit of the tape. On the other hand, when a plurality of sequences are recorded on a single endless tape, a hole 52 will be disposed between each such sequence, and accordingly the stop-start system functions to disconnect the tape drive following the playing of each recorded sequence, as well as to condition the tape for playing of the next sequence.

Figures 9, 11:
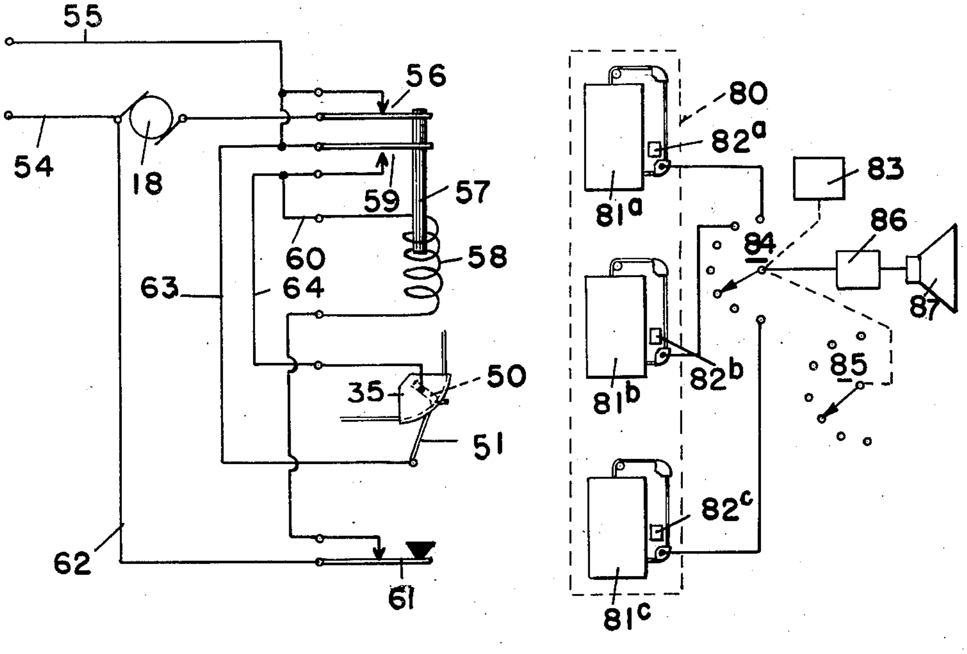
Fig. 9 is a circuit diagram illustrating one of the many possible control circuits utilizing the stop-start switch means illustrated in Figs. 7 and 8.

Fig. 9 illustrates diagrammatically one of the many possible control circuits employed to cycle the machine in response to momentary contact of switch contact point 51a on conductive pin 50. In said diagram, the tape driving motor 18 is shown to be connected to a power source through a circuit comprising conductors 54, 55, and a relay switch 56 which is normally closed. Opening and closing of switch 56 is controlled by a relay comprising armature 57 and coil 58, the armature operating to open switch 56 and to close an oppositely functioning relay switch 59 when the relay is energized. One side of the coil is connected by a conductor 60 to one contact of relay switch 59, and by a conductor 64 to the conductive pin 50 of the tape guide shoe 35. The other side of the coil is connected to normally closed switch 61, which is in turn connected through conductor 62 to one side of the power line. Normally open relay switch 59 is connected by the conductors 63, 64 to the tape-controlled switch 50, 51 which is open when an imperforate length of tape is running over the conductive pin 50. The aforesaid switch 61 diagrammatically represents a push-button switch, an electric-eye controlled switch, a door-actuated switch, a remotely controlled switch, or a switch circuit which is adapted to be energized upon the occurrence of a condition selected to put the machine into operation.

The operation of this circuit is as follows: Assuming switch 50, 51 to be open, due to the insulating tape spacing the contacts thereof, the motor 18 and consequently the machine will be running and pulling the tape over the magnetic head 36. When a hole 52 in the tape appears under the contact point 51a of switch contact 51, the switch 50, 51 will be momentarily closed and immediately re-opened by the hole moving slightly past said contact point as described. The aforesaid momentary closing of the switch causes relay coil 58 to be energized by the completion of a circuit from power lead 55 through conductor 63, switch 50, 51, conductors 64 and 60 to one side of the coil, and from the other side through switch 61 and conductor 62 to the power lead 54. The coil pulls the armature 57 downwardly to open switch 56 and close switch 59. The circuit of motor 18 is accordingly opened, and simultaneously a holding circuit for the relay is completed from supply conductor 55 through switch 59 to coil 58, and from the other side of the coil through switch 61 and conductor 62 back to supply conductor 54. So long as the relay is energized the motor will not run, although, as above noted, reopening of switch 50, 51 conditions the motor circuit for reclosing. When switch 61 or any circuit or switch represented thereby is opened, the coil 58 is deenergized and such results in closing of switch 56 which establishes the motor circuit. It will be understood that the above described cycle is capable of repeating itself as desired, thus to provide a simple yet effective stop-start control means for a repeating type of reproducing (and recording) machine.

In the above described circuit, it was assumed that the same power source was employed for both the tape driving motor 18 and the actuating relay and associated controls. However, different power sources may be employed, for example, when it is desired to run the motor from an A. C. source, and the relay on D. C. current, the latter because under certain conditions D. C. operation of the relay coils does not disturb the magnetic system as much as A. C. operation thereof.

Referring to Fig. 10, illustrating the application of a removable magazine type of repeating recording machine employing an endless tape record medium of the invention in its application to a spot-announcing system, the machine generally designated 70 has a unit endless tape magazine 71 removably mounted thereon, in position such that the external portion of the magazined tape energizes a pick-up head 72. The electrical output of this head passes through volume control 73 to amplifier 74. The output of the amplifier is fed to one or a plurality of loud speakers 75 or other distributing system.

It is also possible to use unit magazines as described in multiple, in conjunction with a suitably designed coin-operated selective phonograph (juke box) to provide such an instrument with the advantages peculiar to magnetic recording. Referring to Fig. 11, being a block diagram of a typical "juke box" application, a machine generally designated 80 removably mounts a plurality of endless tape magazines 81a, 81b, 81c, whose tapes each carry an individual selection, and a plurality of magnetic heads 82a, 82b and 82c each individual to a magazine. A conventional electrical selector system generally designated 83 selects the appropriate recording by means of switch 84 and starts the proper tape drive through switch 85. The output of the associated magnetic head is fed to a conventional amplifier 86 and thence to a loud speaker 87.

It is to be understood that the illustrated applications of a removable magazine, sound-on-endless tape reproducing machine are to be regarded as typical only of many other applications where repeat and/or short length magnetic reproduction is desired.

While the above described apparatus achieves the stated and other desirable objectives of a magnetic sound-on-tape repeating-type recording and/or reproducing machine, it will be understood that the invention is not limited to the illustrated constructional details. On the other hand, many changes can be made in carrying out the above constructions without departing from the scope of the invention, and it is therefore intended that all matter contained in the above description or shown in the accompanying drawings shall be interpreted as illustrative and not in a limiting sense.

We claim:

1. In an endless tape recording and/or reproducing machine, a chassis, a vertically disposed supporting plate affixed thereto and including quick-detachable magazine securing and supporting means on its front face, a self-contained record medium package removably mounted on said supporting means to lie against the supporting plate and comprising a box-form magazine having a tape inlet opening in its top wall and a tape outlet opening in its side wall adjacent the bottom wall, and an endless tape record medium stored therein in random layers and having a short-length portion extending externally of the magazine between its outlet and inlet openings, a tape driving means mounted on the supporting plate above said inlet opening and being operative to draw tape from and to return it to said magazine through said outlet and inlet openings, respectively, and a magnetic head carried by said supporting plate and being disposed in the path of the tape moving between said openings.

2. In an endless tape recording and/or reproducing machine, a chassis, a vertically disposed supporting plate affixed thereto and including quick-detachable magazine securing and supporting means on its front face, a self-contained record medium package removably mounted on said supporting means to lie against the supporting plate and comprising a box-form magazine having a tape inlet opening in its top wall and a tape outlet opening in its side wall adjacent the bottom wall and an endless tape record medium whose major length portion is contained in the magazine and including a short-length portion extending externally of the magazine between its outlet and inlet openings, the width of the magazine being slightly greater than the width of the tape whereby the tape random-layers itself in the magazine when fed thereinto, a tape driving means mounted on the supporting plate above said inlet opening and being operative to draw tape from and to return it to said magazine through said outlet and inlet openings, respectively, and a magnetic head carried by said supporting plate and being disposed in the path of the tape moving between said openings.

3. An endless tape recording and/or reproducing machine as set forth in claim 1, wherein spaced tape guides mounted on said supporting plate are effective to guide the external length of tape drawn from the magazine to said magnetic head and thence to said driving means.

4. An endless tape recording and/or reproducing machine as set forth in claim 1, wherein spaced tape guides mounted on said supporting plate are effective to guide the external length of tape drawn from the magazine to said magnetic head and thence to said driving means, and wherein slack-tape guiding means positioned between the tape driving means and magazine inlet opening is effective to positively direct the tape leaving the driving means to the magazine inlet opening.

5. An endless tape recording and/or reproducing machine as set forth in claim 1, wherein means are provided adjacent the magazine outlet opening for effecting tensioning of the external length of tape.

6. An endless tape recording and/or reproducing machine as set forth in claim 1, wherein spaced tape guide shoes carried by said supporting plate are effective to guide the external length of tape drawn from the magazine outlet opening to the magnetic head and thence to said driving means, one of said guide shoes being positioned adjacent the outlet opening, and means including said last-named guide shoe for effecting tensioning of the external length of tape.

7. An endless tape recording and/or reproducing machine as set forth in claim 1, wherein the magazine carries tape tensioning means adjacent its outlet opening.

RUSSELL J. TINKHAM.
ROBERT L. LANDON.

REFERENCES CITED

The following references are of record in the file of this patent:

UNITED STATES PATENTS

| Number | Name | Date |
|---|---|---|
| 667,436 | Granichstaedten | Feb. 5, 1901 |
| 879,691 | Tannehill | Feb. 18, 1908 |
| 1,282,154 | Webster | Oct. 22, 1918 |
| 1,296,476 | Burnett | Mar. 4, 1919 |
| 1,297,049 | Webster | Mar. 11, 1919 |
| 2,109,627 | Finch | Mar. 1, 1938 |
| 2,259,517 | Drenkard | Oct. 21, 1941 |
| 2,410,569 | Concant | Nov. 5, 1946 |

FOREIGN PATENTS

| Number | Country | Date |
|---|---|---|
| 390,878 | Germany | Feb. 25, 1924 |
| 696,161 | France | Dec. 27, 1930 |
| 441,479 | Great Britain | Jan. 13, 1936 |